July 22, 1958 E. E. HAHN ET AL 2,844,737
SEMI-CONDUCTIVE MATERIALS
Filed Oct. 30, 1953
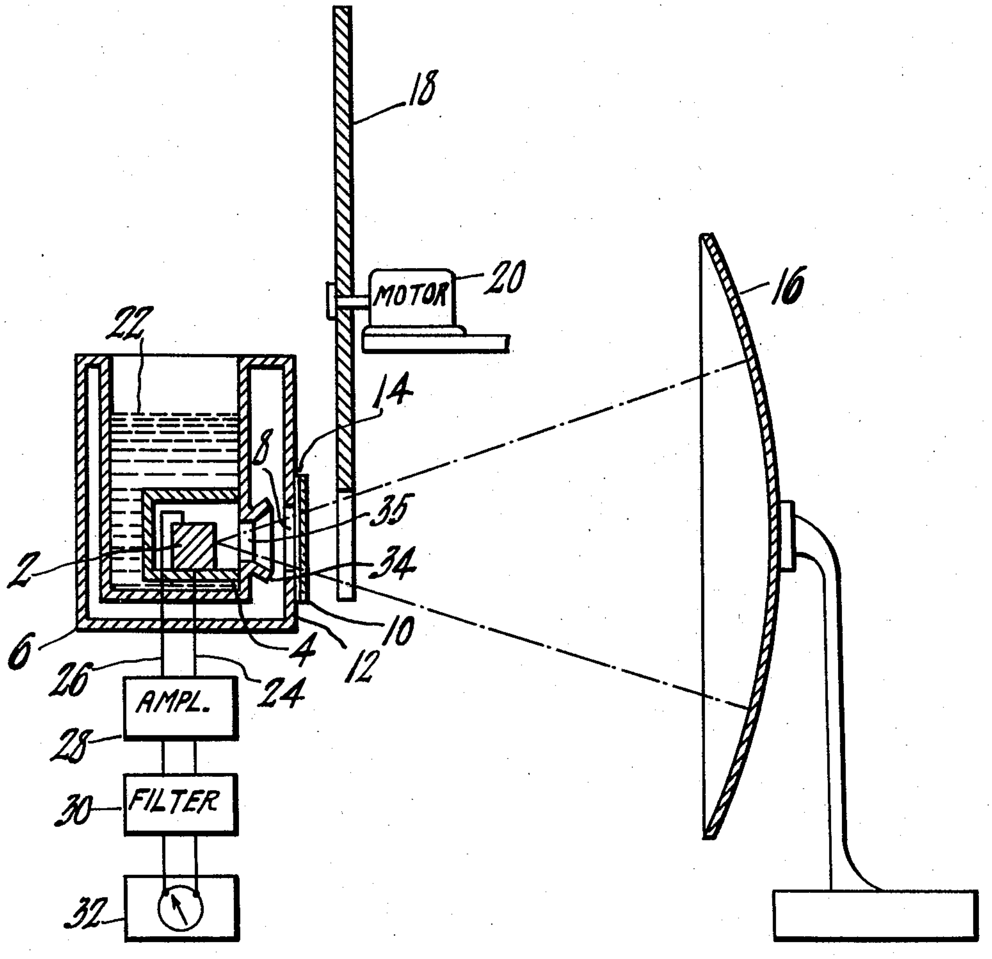
INVENTORS
EDWIN E. HAHN
GEORGE A. MORTON
ALBERT G. MORRIS &
MELVIN L. SCHULTZ
BY J. L. Whittaker
ATTORNEY United States Patent Office 2,844,737

Patented July 22, 1958

2,844,737

SEMI-CONDUCTIVE MATERIALS

Edwin E. Hahn, Melvin L. Schultz, and George A. Morton, Princeton, and Albert G. Morris, Lawrenceville, N. J., assignors to Radio Corporation of America, a corporation of Delaware Application October 30, 1953, Serial No. 389,232

15 Claims. (Cl. 250—211)

This invention relates to semi-conductive materials and more particularly to semi-conductive materials which are sensitive to relatively long wave length radiation and to devices utilizing such materials.

Photo-sensitive semi-conductor devices have been previously made utilizing semi-conductive germanium. Such devices may be made which will respond to electromagnetic radiation of about 1.7 micron wave length and shorter when maintained at readily attainable temperatures.

The energy difference or gap between the upper edge of the valence band of germanium and lower edge of the conduction band is about 0.7 electron volt. The operation of many semi-conductor photo-devices at room temperature is dependent upon the raising of electrons by photo energy from the valence band into the conduction band. Thus the conductivity of the material is affected by varying the total number of charge carriers available for conducting current. Electromagnetic radiation of wave length shorter than 1.7 micron contains sufficient energy to raise an electron through the 0.7 electron volt energy gap of germanium. Radiation of longer wave length than about 1.7 micron does not contain sufficient energy to do this. Therefore, photosensitive devices utilizing semi-conductive germanium at room temperature are effective to detect radiation in the near infrared region only and not at wave lengths of more than about 1.7 micron.

It is desirable, however, to provide a device that will detect radiation of 6–10 micron wave length. The human body, for example, radiates a relatively large amount of energy of about 10 micron wave length. Radiation of 6–10 micron wave length contains sufficient energy to raise an electron through an energy difference of only about 0.1 to 0.2 electron volt. It is therefore desirable to provide a semi-conductive material having an excitable energy gap of about 0.1 to 0.2 electron volt.

Generally, semi-conductive germanium contains so-called impurity centers distributed throughout its volume. These impurity centers comprise charge carriers, electrons or holes, in energy levels between the valence and conduction bands of the germanium, usually about .01 to .05 electron volt from one of these bands. The charge carriers may be bound to the impurity centers when they are not excited by externally applied energy. Normally, however, at temperatures above about 50° K. substantially all these charge carriers are excited by ambient thermal energy into the conduction band, in the case of electrons, or into the valence band in the case of holes. This excitation of the charge carriers is also referred to as ionization of the impurity centers.

Previously known semi-conductive germanium comprising conventionally used impurity-yielding materials may be made sensitive to relatively long wave length radiation by cooling it to temperatures below about 50° K., and preferably to less than 10° K. This cooling is necessary to reduce the thermal energy of the material in order to de-ionize the impurity centers, i. e., to condense the charge carriers back to the energy levels bound to the impurity centers. Long wave length radiation can affect the conductivity of germanium when its impurity centers are de-ionized because it has sufficient energy to raise charge carriers through the relatively small energy gap of .01 to .05 electron volt. Thermal excitation of the carriers must be avoided, however, in order to maintain the carriers in an unexcited state when they are not acted on by the desired radiation.

Conventionally used impurity-yielding materials provide electrons or holes at levels about .01 to .05 electron volt from the conduction or the valence band when they are de-ionized. In order to provide a material that is sensitive to long wave length radiation at more readily attainable temperatures such as the temperature of liquid nitrogen, it is desirable to provide a material having impurity centers at an energy level between 0.1 and 0.2 electron volt from the nearest band.

Accordingly, it is an object of the instant invention to provide improved semi-conductor devices.

Another object is to provide an improved photosensitive semi-conductor device.

Another object is to provide an improved semi-conductor device which is sensitive to radiation of about 5–10 micron wave length.

Another object is to provide an improved photosensitive device which is sensitive to infrared radiation of wave length longer than about 1.7 micron at temperatures equal to and higher than the temperature of liquid nitrogen.

Another object is to provide improved semi-conductive materials suitable for use in infrared photosensitive devices.

Still another object is to provide improved semi-conductive materials having excitation energy level gaps of about 0.1 to 0.2 electron volts at readily obtainable temperatures.

These and other objects may be accomplished according to the instant invention wherein it has now been discovered that semi-conductive germanium may be produced which exhibits an energy gap of 0.1 to 0.2 electron volt at temperatures below about 200° K. The material is produced by doping relatively pure germanium with two opposite conductivity type-determining impurity-yielding materials. One of the impurity-yielding materials is selected from a group consisting of elements more than one column removed from germanium in the periodic table according to Mendeleeff. The other, opposite type, impurity-yielding material is selected from a column adjacent germanium in the periodic table. Specifically any of the elements of the first and second columns, including both sub-groups of each column, may be utilized in conjunction with any of the elements of the nitrogen group to dope germanium according to the instant invention. By the nitrogen group it is meant to include nitrogen, phosphorus, arsenic, antimony and bismuth.

Conversely any of the elements of the sixth, seventh or eighth columns may be utilized in conjunction with any of the elements of the boron group, which includes boron, aluminum, gallium, indium and thallium.

The invention will be described in greater detail with reference to the drawing of which:

The single figure is a schematic, cross-sectional, elevational view of a device utilizing a material according to the instant invention.

According to a preferred embodiment of the invention a single crystal of semi-conductive germanium may be grown by the Kyroupolos-Czochralski technique. This technique comprises touching a seed crystal to the surface of a molten mass of germanium and withdrawing the seed crystal as the material of the mass freezes upon the seed to form a single crystal attached to the seed.

According to the preferred embodiment of the invention, a relatively large quantity of gold is added to the melt and thoroughly mixed into the melt by any suitable means such as stirring. A relatively small quantity of arsenic is also added and a single crystal is grown oriented preferably in the direction of its (111) axis.

A typical crystal may be grown, for example, by melting together in a carbon crucible about 10 grams of relatively pure germanium and about 36 mg. of gold. About 10 mg. of a solution of arsenic in germanium is also added. This solution comprises an arsenic concentration of about $10^{-4}$, or about $1.3\times10^{18}$ arsenic atoms per cubic centimeter of solution. The mixture is melted in a non-oxidizing atmosphere such as may be provided by enclosing the crucible within a chamber and maintaining a flow of helium through the chamber. When the mixture is thoroughly melted it may be stirred with a carbon rod or agitated by any other convenient means such as by raising and lowering its temperature alternately at a relatively rapid rate to produce thermal convection within the melt. This mixing is a relatively important preliminary step to growing a crystal when it is desired to provide a relatively high degree of uniformity in the grown crystal.

When the melt is thoroughly intermixed it is brought to, and maintained at a temperature very slightly above its freezing point. A seed crystal is contacted to the surface of the melt and then slowly withdrawn from the melt as a crystal forms attached to the seed. Single crystal growth of germanium according to this technique is generally best favored when the seed and the growing crystal are oriented in the (111) direction. Other orientations may be utilized, but with an increased risk of difficulty in maintaining crystal growth in single crystal form.

Although the melt includes a quantity of gold greatly exceeding the quantity of arsenic incorporated in it, a major portion of the crystal grows with much more nearly equal quantities of arsenic and gold atoms distributed in it. This effect is due to the segregation characteristics of gold and arsenic which will be explained in greater detail hereinafter.

Although it is not definitely known, it is believed that in a crystal grown according to this embodiment of the invention there are distributed about twice as many arsenic atoms as gold atoms. It is further believed that each gold atom provides available holes in two or possibly three different levels between the conduction band and the valence band of the germanium. It is also thought that the arsenic atoms provide electrons that balance out, fill up, or in some other way counteract the effect of the holes provided by the gold atoms in the one or possibly two levels closest to the valence band. Thus only those holes provided by the gold atoms at the level farthest removed from the valence band are available to be excited into the valence band. The holes provided by the gold at the closer levels are not effective since they have been balanced by the arsenic impurities. Therefore the sensitivity of the doped germanium at low temperatures is determined by the relatively high energy gap between the uppermost bound holes provided by the gold atom and the valence band. This energy gap is about 0.1 to 0.2 electron volt and electrons are readily raised through it from the valence band to the impurity centers by 5–10 micron wave length radiation energy. Also, thermal energy at 200° K. and lower temperatures is not sufficient to raise electrons through this gap.

In growing a crystal according to the preferred embodiment of the instant invention, two opposite conductivity type-determining impurity-yielding materials are added to the melt. One of these materials is an element more than one column removed from the fourth column of the periodic table, preferably one of the elements of the copper and zinc sub-groups; a preferred material of this group is zinc. The second impurity-yielding material is an element of the nitrogen group of the periodic table; arsenic is a preferred example. To provide maximum infrared sensitivity in a crystal according to this embodiment it is desirable that the number of atoms of the element of the nitrogen group in the crystal be at least as great as the number of atoms of the other impurity-yielding material.

To provide a desired concentration of an impurity-yielding material in a major portion of a grown crystal it is usually necessary to add a relatively larger proportion of the impurity-yielding material to the melt from which the crystal is grown. The desired impurity concentration in the melt may be determined by dividing the desired concentration in the crystal by a factor known as the segregation coefficient.

The segregation coefficient of an impurity material in germanium, for example, may be defined as the ratio of the concentration of the material on the solid side of the interface of a growing crystal to the concentration on the liquid side of the interface. (Concentration in solid÷concentration in liquid.) For example, the segregation coefficient of gold is several orders of magnitude smaller than the segregation coefficient of arsenic. Therefore, in order to provide even one-third as many gold as arsenic atoms in a grown crystal, it is necessary to include a far greater concentration of gold than of arsenic in the melt from which the crystal is to be grown.

Infrared sensitive semi-conductive germanium may be made according to the instant invention utilizing impurity-yielding materials other than those heretofore described in connection with the preferred embodiment. As stated heretofore, the practice of the invention includes doping semi-conductive germanium with two opposite type conductivity type-determining impurity-yielding materials, one of which is more than one column removed from germanium in the periodic table, and the other of which is in a column adjacent germanium. For example, cesium, barium or strontium may conveniently be utilized in place of gold, and antimony or bismuth may be substituted for the arsenic heretofore described. As a further example, elements such as selenium, tellurium and chromium may be utilized in conjunction with aluminum, gallium or indium.

In each instance the quantities of the two impurity-yielding materials, relative to each other, are preferably selected so that a completed crystal includes at least as many atoms from the group adjacent germanium in the periodic table as from the group more than one column removed. The total concentration of each of the impurity-yielding materials in the crystal is preferably about $10^{14}$ to $10^{16}$ atoms per cubic centimeter.

It should be understood, of course, that the practice of the invention is not limited to growing a crystal by the Kyroupolos-Czochralski technique nor to crystals grown by that method. Equally effective results may be obtained by growing a crystal according to the invention by other methods such as zone melting or gradient freezing. The instant invention is not limited to any particular crystal growing apparatus but includes growing a crystal by any known means. An essential feature of the invention relates to the presence of selected conductivity type-determining impurity centers in a crystal of semi-conductive germanium. The means utilized to induce these impurity centers into a crystal are not critical.

A typical device utilizing a material according to the invention is illustrated in the drawing. A block 2 cut from a single crystal of germanium grown as described heretofore in connection with the preferred embodiment is soldered to an inner wall 4 of a metal vacuum jar 6. The block may conveniently be a cube about 1 cm. on a side and is made as large as is practical in order to provide maximum radiation absorption in the block. It is preferably placed within the vacuum chamber of the jar in order to minimize any contamination and heat loss that may affect it. A window 8 is cut in the outer wall 12 of the jar opposite the block. The window may be covered with any convenient infrared radiation-transparent material 10 such as silver chloride or rock salt. A pane of this material may be sealed in place by any convenient means such as the wax seal 14 or a cement.

The block is preferably shielded from all heat radiation except that which is directed upon it by the reflector 16. Shielding may be conveniently provided by the conical visor 34 having an aperture 35 aligned with the radiation window 8.

Infrared radiation is directed upon the block through the window by the reflector 16 which serves to concentrate received radiation and to provide sensing directivity. A chopping disc 18 driven by a motor 20 is provided adjacent the window periodically to interrupt the received signal. Periodic interruption of the received radiation is desirable because when subjected to pulsating radiation the device produces a constant or slowly modulated but rapidly pulsating signal which may be more readily amplified than a constant or slowly modulated D.-C. signal.

The vacuum jar is partially filled with liquid nitrogen 22 which serves to cool the wafer to a temperature of about 77° K. Electrical leads 24 and 26 are connected to opposite sides of the block and serve to connect the wafer to an amplifier 28. The amplifier is provided with biasing means so that in effect it constantly measures the conductivity of the wafer and amplifies the change of conductivity produced in the wafer by the impressed radiation. The amplified signal is fed through a filter 30 to remove the pulsating frequency component, and may be displayed on a meter 32 or any other convenient indicating device.

A device such as that illustrated exhibits maximum sensitivity to radiation of about 6 microns wave length and is relatively sensitive also to radiation of 10 microns wave length and longer. The degree of sensing directivity may be controlled according to known principles as by varying the size and shape of the reflector.

Infrared sensing devices utilizing materials according to the instant invention may be conveniently operated at about the temperature of liquid nitrogen. Somewhat improved sensitivity may be obtained by operating such devices at lower temperatures but temperatures substantially lower than the boiling point of nitrogen are relatively difficult to provide. With somewhat decreased sensitivity, materials according to the invention may also be utilized in infrared detection devices that operate at temperatures up to about 200° K.

There have thus been described improved infrared-sensitive semi-conductive materials, methods of making these materials, and devices utilizing them.

What is claimed is:

1. Crystalline semi-conductive germanium having incorporated in its crystal lattice conductivity type-determining impurities consisting essentially of two opposite conductivity types, impurities of one of said types being provided by an element more than one column removed from the fourth column of the periodic table according to Mendeleeff, and impurities of the other one of said types being provided by an element adjacent the fourth column of said periodic table, there being at least as many atoms of said other impuritiy present as of said one impurity in said crystalline germanium.

2. The invention according to claim 1 in which said crystalline semi-conductive germanium has incorporated in its crystal lattice about $10^{14}$ to $10^{16}$ atoms of said impurities per cubic centimeter of its volume.

3. Crystalline semi-conductive germanium having incorporated in its crystal lattice conductivity type-determining impurities consisting essentially of two opposite conductivity types, impurities of one of said types being provided by an element selected from the copper and zinc sub-groups of the periodic table according to Mendeleeff, and impurities of the other one of said types being provided by an element of the nitrogen group of said periodic table, there being at least as many atoms of said other impuritiy present as of said one impurity in said crsytalline germanium.

4. A material according to claim 3 in which said impurities of said one of said types are provided by gold.

5. A material according to claim 3 in which said impurities of said one of said types are provided by zinc.

6. A semi-conductor device comprising a body of crystalline semi-conductive germanium, said body having electrodes connected thereto, said germanium having incorporated in its crystal lattice conductivity type-determining impurities consisting essentially of two opposite conductivity types, impurities of one of said types being provided by an element more than one column removed from the fourth column of the periodic table according to Mendeleeff, and impurities of the other one of said types being provided by an element adjacent the fourth column of said periodic table, there being at least as many atoms of said other impurity present as of said one impurity in said crystalline germanium, both said elements being solids at ordinary room temperature.

7. A semi-conductor device comprising a body of crystalline semi-conductive germanium, said body having electrodes connected thereto, said germanium having incorporated in its crystal lattice conductivity type-determining impurities of two opposite conductivity types, impurities consisting essentially of one of said types being provided by an element selected from the copper and zinc sub-groups of the periodic table according to Mendeleeff, and impurities of the other one of said types being provided by an element of the nitrogen group of said periodic table, there being at least as many atoms of said other impurity present as of said one impurity in said crystalline germanium.

8. In an infrared radiation-sensitive device comprising means to maintain an infrared sensitive element at a temperature below about 200° K., means to shield said element from unwanted radiation, means to expose said body to a desired radiation field, and means to measure changes in said element produced by exposure thereof to said radiation field, the improvement consisting of forming said element of crystalline semi-conductive germanium having incorporated in its crystal lattice conductivity type-determining impurities consisting essentially of two opposite conductivity types, impurities of one of said types being provided by an element more than one column removed from the fourth column of the periodic table according to Mendeleeff, and impurities of the other one of said types being provided by an element adjacent the fourth column of said periodic table, there being at least as many atoms of said other impurity present as of said one impurity in said crystalline germanium.

9. A device according to claim 8 in which said means to maintain said body at a temperature below about 200° K. includes means to maintain said body in heat transfer relation with a liquefied gas.

10. A device according to claim 8 including means periodically to interrupt said exposure of said body.

11. An infrared radiation-sensitive device including a body of crystalline semi-conductive germanium, said germanium having incorporated in its crystal lattice about $10^{14}$ to $10^{16}$ atoms per cc. of an element of the group consisting essentially of copper, silver, gold, zinc, cadmium and mercury, and a quantity of an element of the nitrogen group of the periodic table sufficient to balance selected ones of the energy levels present in said material due to said element of said group.

12. An infra-red radiation-sensitive device including a body of crystalline germanium with electrodes connected thereto, said germanium having incorporated in its crystal lattice impurities consisting essentially of about $10^{16}$ atoms of gold per cubic centimeter of its volume and a quantity of arsenic sufficient to balance selected ones of the energy levels present in said germanium due to said gold.

13. An infra-red radiation-sensitive device including a body of crystalline germanium with electrodes connected thereto, said germanium having incorporated in its crystal lattice impurities consisting essentially of about $10^{16}$ atoms of gold per cubic centimeter of its volume and a quantity of an impurity selected from the class consisting of antimony, phosphorus, and bismuth sufficient to balance selected ones of the energy levels present in said germanium due to said gold.

14. Crystalline semi-conductor germanium having incorporated in its crystal lattice conductivity type-determining impurities consisting essentially of two opposite conductivity types, impurities of one of said types being provided by an element selected from the first and second columns of the periodic table according to Mendeleeff including both subgroups of each of said columns, and impurities of the other one of said types being provided by an element selected from the nitrogen group of said periodic table, there being at least as many atoms of said other impurity present as of said one impurity in said crystalline germanium.

15. Crystalline semi-conductor germanium having incorporated in its crystal lattice conductivity type-determining impurities consisting essentially of two opposite conductivity types, impurities of one of said types being provided by an element selected from the sixth, seventh and eighth columns of the periodic table according to Mendeleeff including all subgroups of said columns, and impurities of the other one of said types being provided by an element selected from the boron group of said periodic table, there being at least as many atoms of said other impurity present as of said one impurity in said crystalline germanium.

References Cited in the file of this patent

UNITED STATES PATENTS

| | | |
|---|---|---|
| 2,547,173 | Rittner | Apr. 3, 1951 |
| 2,597,028 | Pfann | May 20, 1952 |
| 2,631,356 | Sparks et al. | Mar. 17, 1953 |
| 2,641,711 | Tommasi | June 9, 1953 |
| 2,671,154 | Burstein | Mar. 2, 1954 |
| 2,677,106 | Hayes et al. | Apr. 27, 1954 |
| 2,701,326 | Pfann | Feb. 1, 1955 |
| 2,771,382 | Fuller | Nov. 20, 1956 |

OTHER REFERENCES

Physical Rev., vol. 91, No. 5 of September 1, 1953, page 1282 (received date July 14, 1953).